F. PEABODY.

KEYED INSTRUMENT OF MUSIC.

No. 1,866. Reissued Feb. 7, 1865.

Witnesses

H. P. Hale Jr

H. E. Fisher.

Inventor.

Francis Peabody by his attorney

R. Wheeler

UNITED STATES PATENT OFFICE.

FRANCIS PEABODY, OF SALEM, MASSACHUSETTS.

KEYED INSTRUMENT OF MUSIC.

Specification forming part of Letters Patent No. 40,573, dated November 10, 1863; Reissue No. 1,866, dated February 7, 1865.

*To all whom it may concern:*

Be it known that I, FRANCIS PEABODY, of Salem, in the county of Essex and State of Massachusetts, have invented a certain new and useful Improvement in Keyed or various other Musical Instruments; and I do hereby declare the same to be described as follows, reference being had to the accompanying drawings, forming a portion of the specification of my invention.

Figure 1:
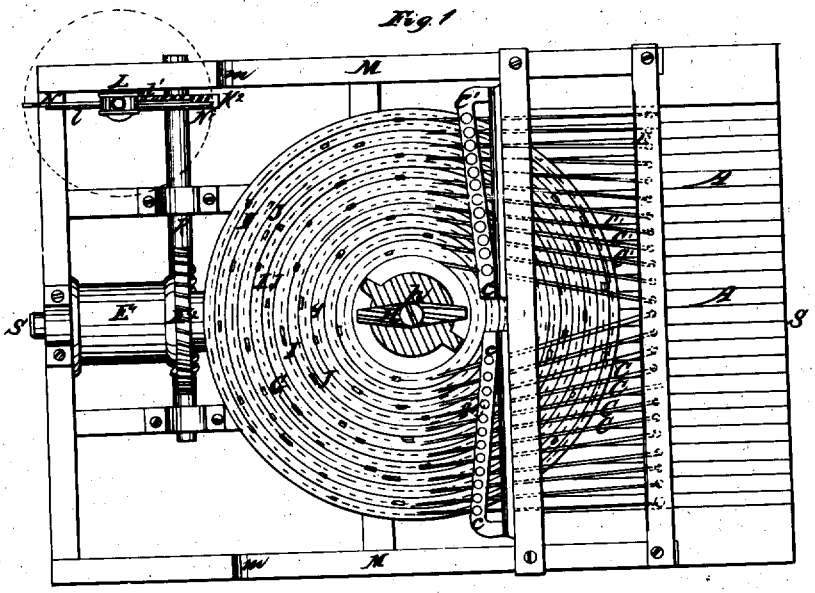
Figure 2:
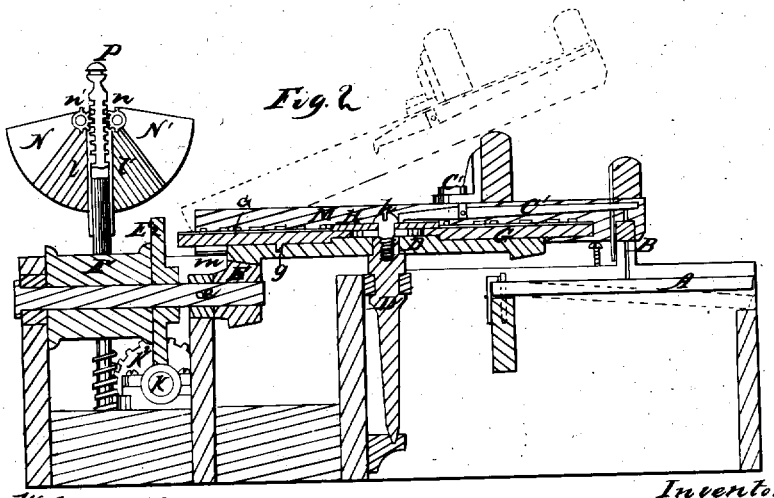

Of such drawings, Figure 1 is a plan of my invention in part, while Fig. 2 is a vertical section taken on the line *s s* of Fig. 1, and illustrative of the remainder of my invention.

Similar letters of reference indicate like parts in both figures.

The tints are employed to aid in distinguishing parts, but do not indicate the materials of which they may be composed.

My invention is applicable to most, if not all, kinds of musical instruments which operate by means of keys or their equivalents; and it consists in certain means whereby such a musical instrument may be made so as to be capable of executing tunes automatically, and require but little space for the automatic operative mechanism, as well as little time for changing the parts so as to enable them to play any tune for which properly arranged dents or points have been provided. There is no limit to the number and variety of tunes which, through my invention, an instrument of ordinary size and appearance may be made to perform automatically, and this without necessarily involving any serious expense in the construction of the instrument, the expense being incurred, if preferred, by small increments during the use of the instrument, by the purchase of dents suitably arranged to execute tunes, singly or in small quantities, according to the ability or taste of the purchaser, or according as new and desirable music shall be found to appear.

My invention further consists in certain means whereby the rate of speed of the automatic instrumental performances may be regulated. These means admit of a very ready and rapid adjustment, so as to vary at will the time of the music.

My invention does not interfere in the least with the use of the instrument in the ordinary manner in playing by the fingers of the performer. It even allows additional parts to be played by hand at the same time that the principal parts are being performed automatically.

To enable others skilled in the art to make and use my invention, I will proceed, by the aid of the drawings and the letters of reference marked thereon, to describe its construction and operation.

A A, &c., represent the musical-instrument keys adapted to be operated by the fingers of a performer, they being supposed to be connected in any ordinary manner to the other or remaining and not represented works of the instrument. B B, &c., are trackers, and C C′, &c., are levers adapted to depress the several corresponding keys, A A, through the medium of the corresponding trackers, B B. The centers of the motions or the fulcra of the several levers, C C′, are indicated at *c c c′ c′*, and their arrangement is such that an elevation of the lesser arm of either of the levers C or C′ induces a depression of the corresponding key at the front of the instrument, and of course a corresponding emission of sound from the instrument; but so long as any of these levers C C′ may not be so operated the keys will remain at rest or may be operated by hand at the will of the player.

A stout circular plate, D, fixed in a horizontal plane on the top of the vertical shaft D′, is adapted to receive a slow rotary motion from a pinion or small bevel gear-wheel, E, which is fixed on a shaft, *c*, and receives motion through the aid of a windlass, E′, actuated by a cord and weight or from some other suitable means. The horizontal plate D is suitably formed on its upper surface to receive and give support to a plate, G, of metal, wood, or any other suitable material, which, rotating with the wheel, performs the function of operating the levers C C′ by means of cams, pins, or dents fixed in concentric circles in the upper part of the plate G, as indicated by I and J in Fig. 1. This plate G is the only portion that need be changed in adapting the instrument to perform any different piece of music. From motives of economy I have constructed this plate G of wood, and have been successful in producing a sufficiently rigid and apparently a durable plate by gluing together thin pieces of wood, with the grain of one layer or piece crossing the grain of the next layer or piece; but I prefer to make the plates of metal.

I believe cast-iron plates G, with the skill now attained in the manufacture of sharp castings, may be so made that little touching or finishing by hand may be considered necessary to completely adapt them to perform tunes on any properly-adapted instrument, and I propose that such plates shall be carefully and rapidly prepared by the aid of machinery for cutting and delicately finishing them, if necessary; also, that such plates so prepared shall be kept for sale by music-dealers in the same manner as sheets of music are kept and sold, thus establishing a new branch of manufacture and commerce. The form of the plate allows a great number to be stored in a little space and of their being readily packed for transportation.

Three or any other suitable number of holes, *g g*, may be bored in the plate D, corresponding pins or projections to enter them being extended from the under face of the plate G, these holes and projections serving to compel the plate G to rotate with the plate D while the latter may be in revolution. It is evident that it is practicable, and may, on some accounts, be preferable, to extend the projections from the plate E, and to make the recesses in the plate G, in order that a lot of plates G may be better packed together; but I do not confine my invention to either of these specific arrangements, the purpose being simply to compel the plate G to rotate with the plate D so long as they may be in contact, and also to allow of a ready separation and reunion of the plates at will.

A button, H, adapted to turn on the central pin or screw, *h*, serves to secure and release the plate G by a very simple operation, the plate being provided with a large hole (at its center) of the proper form to allow of the plate being slid over the button H when in one position relatively thereto, and of being very firmly retained in place by such button, when it may be afterward turned partly around on the pin *h*.

I divide the levers C C′ into two sets in the manner as represented in Fig. 1. The concentric circles I (denoted by black lines) indicate the lines on which those dents may be fixed which are to operate the keys of the treble through the medium of one set, C′, of the levers. The concentric circles J (denoted in red lines) indicate the lines on which those dents must be fixed which are to operate the bass-keys through the medium of the other set, C, of levers. This division is important to be understood by the parties who lay out and plan the mechanism, and it will readily be understood by artists of proper skill. It affords great advantages in the room which it makes available both in the arrangement of the levers C C′ and the dents I J, but in case of an occasional repair or readjustment of some part, it is not necessary for the operator or performer to understand this or the other nice point about the mechanism, it being sufficient to the successful use of my invention for the operator to possess sufficient mechanical skill to simply remove a plate G, and substitute another, and to wind up or otherwise prepare and set in operation the mechanism which effects the rotation of the plate D.

In my arrangement of the levers relatively to the concentric circles of the dents it will be seen that each dent of the bass will not actuate any of the treble-levers while passing underneath the series, but will pass between some two of them. So, with each dent of the treble, it, while passing underneath the series of bass-levers, will not actuate any of them, but will pass between some two of them.

The levers C C′, it will be observed, are hung on a movable frame, M, which is arranged in the instrument and applied to it so as to be capable of being turned upward on hinges *m m*, in order that obstructing parts may be readily elevated out of the way whenever it may be desirable to remove the plate G from the wheel D or to apply such a plate to the said wheel.

The additional mechanism represented contributes to control or regulate the rate of speed at which it may be desirable for the plate G to revolve. The shaft *e* carries a large worm-gear, $E^2$. A cross-shaft, K, lying directly below this, carries a worm or screw having a very great pitch or angle in the position of its thread relatively to its axis, and adapted to be acted on by the teeth of the gear $E^2$, and so as to compel a quick motion of the shaft K, the same being received from the slow motion of the gear E in a manner which will be readily understood by mechanics. A worm-gear, $K^2$, on the shaft K and near the upright shaft L, serves to communicate a quick motion to the latter by means of a worm or endless screw on the shaft L, so that the result is a rotary motion of the upright shaft L, produced by the agent or power employed to turn the windlass D′ and give motion to the plate G, the rotary motion of the shaft L being many hundred or thousand fold quicker than that of the plate G or that of the windlass. The upper portion of the shaft L is tubular, and carries one set of stationary and another set of movable wings adapted through the resistance of the air to prevent the shaft from being revolved at a too high velocity. The fixed wings or surfaces, immovable except with the shaft, are denoted at L L′. The movable wings are denoted by N and N′. These latter having the form of sectors or circles are arranged, as represented, so as to be capable of turning upward on centers *n n′*, carried by the shaft or projection therefrom. The movable wings N N′ serve practically to extend to a greater or less extent, according as they may be elevated and extended, the wing area exposed to the air. Racks are formed on the opposite sides of a sliding piece, P, mounted to slide vertically within the hollow shaft L. These racks engage with corresponding gearing on the tube or centers of the movable wings N N, in order that by elevating and depressing the piece P the wings may be simultaneously turned on their respective centers *n n'*, and either thrown out or depressed, so as with the stationary wings *l l'* to cause the resistance offered by the air to the rotation of the shaft L to be increased or diminished, and consequently to compel the entire mechanism to be correspondingly restrained or released from restraint. Elevating the rod P will cause the wings N N' to approach the shaft, and thus diminish the amount of surface to act against the air, and cause the music to be performed to be quicker, while a lowering of the rod P will throw the wings N N' farther apart, and thus cause them and the wings L L' to expose more surface to the air, which will create a greater resistance to the motion and compel the mechanism to turn slower, and consequently insure a slower performance of the music.

I find that the motion of the plate G will be controlled very satisfactorily by means of the regulating mechanism, as described, and propose to connect a suitable stop or other equivalent device to the rod P, such as will enable it to be moved and its motion controlled by the hand of the attendant or performer while a piece of music may be in the act of being performed by the instrument, thus allowing the time of certain parts of the piece to be raised at will in order to give expression to words accompanying the performance or to humor any whim and accommodate the taste of the performer.

The mechanism which controls and adjusts the positions of the wings may be varied or be replaced by other suitable devices, or be dispensed with altogether, and friction alone may sometimes be relied on as a substitute. So, also, the worm-gears and screws employed to communicate motion between the shafts *e* and *l* may be replaced by other well-known or equivalent means of conveying power so long as it is conveyed so that the speed of the shaft L may be greatly or sufficiently increased.

Some of the advantages due to separate features of my invention may be separately enumerated as follows:

First. By my employment of the plane or slightly conical or dishing plate, G, so applied to the plate D as to be readily mounted on and removed therefrom and used with the frame M and its series of levers, I am able to adapt not only church organs, but pianofortes and the great majority, if not the whole, of the popular keyed musical instruments now in use, to the automatic performance of music; also, to inaugurate a new branch of trade in supplying the plates with concentrically arranged dents to facilitate the learning of the art of playing on keyed instruments by causing the learner to follow with his fingers the automatic depression of the keys; also, to facilitate the performance by a skilled performer (by adding the action of his hands to that of the automatic parts) of a before impracticable number of parts on a common construction and style of instrument.

Second. By my division of the levers C C' into two series, arranged and having their fulcra disposed as represented—viz., so that the lines of the back ends of the several levers may stand in the position indicated, or in or about in the diameter of the plate G and correspondingly arranging the several dents—that is to say, placing the dent to operate a given bass-key not on the same side of the center of the plate G as the dent to operate a given note and produce and produce the chord desired, but on a part of the plate widely separated therefrom, I am able to render available more space for the levers C C', so as to mount their centers or fulcra and their back ends much wider apart than would be allowable were all the levers to stand with their back ends in a single series on one side of the center of the plate G. I am also able, in fact, to avoid most of the crowding of the dents which would otherwise be experienced in making very full chords with quick passages, and can use very small plates G, and consequently arrange the entire apparatus so as to occupy little space whether in or out of the instrument.

By my employment in connection with an automatic mechanism, substantially as described, of the tubular shaft L, adjustable wings N N', stationary rings L L', and adjusting-rod P, arranged as described, I am able to control the time of the music cheaply and with little or no noise, in a manner which will allow of ready variation by suitable connections during the performance of a piece of music.

Having now fully described my invention, what I claim as new therein, and desire to secure by Letters Patent, is as follows:

1. As my improvement in mechanism for operating the sound-producing parts of a musical instrument, the above-described arrangement of dents (or their equivalents) on a rotary plate, G—viz., in concentric circles and with the circles of treble and bass dents alternating with respect to one another, substantially as set forth.

2. In combination with the said arrangement of dents on a rotary plate, the arrangement of the bass and the treble key levers, or the parts which produce or aid in producing the musical sounds, in two separate series or sets, whereby those of the bass-notes are in one set and those of the treble-notes are in the other set, substantially as specified.

3. In combination with the keys of a keyed musical instrument, a series of operative key-levers and a rotary plate provided with dents arranged on its face, as specified.

4. The combination of the separate operating-wheel D and its operative mechanism, substantially as described, with the plate G, provided with dents, (or their mechanical equivalents,) arranged as explained.

5. The combination of the hinged or elevating frame M with the plate G and the series of levers C C′, or their equivalents.

6. The improved speed-regulator, as composed of one or more adjustable wings, N N′, and their stationary surface or wing or wings, and mechanism for varying the positions of the adjustable wing or wings relatively to one or more stationary wings, substantially as and for the purpose specified.

7. A combination consisting of the rotary plate G, (with its arrangement of dents,) the series of key-levers C C′, (or their mechanical equivalents,) and a mechanism for imparting a rotary motion to the plate G, the said key-levers being applied to the keys and to the dents by means and so as to operate therewith substantially as specified.

FRANCIS PEABODY.

Witnesses:
R. H. EDDY,
H. E. FISHER.